3,729,514
NOVEL CHEMICAL COMPOUNDS AND PROCESS
John B. Hall, Rumson, N.J., assignor to International Flavors & Fragrances Inc., New York, N.Y.
No Drawing. Original application Nov. 4, 1969, Ser. No. 874,038. Divided and this application Apr. 2, 1971, Ser. No. 130,535
Int. Cl. C07c 45/00, 47/38
U.S. Cl. 260—598         4 Claims

ABSTRACT OF THE DISCLOSURE

Novel aldehydes having the structure:

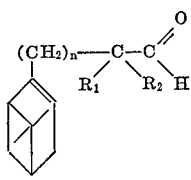

wherein $R_1$ is hydrogen or lower alkyl, $R_2$ is lower alkyl and $n$ is 1 or 2, lower alkyl acetals thereof; lower alkylene cyclic acetals thereof; mixtures thereof and novel process for the production thereof.

---

This application is a division of applicant's parent application Ser. No. 874,038, filed on Nov. 4, 1969, now U.S. Pat. No. 3,636,113, issued Jan. 18, 1972.

BACKGROUND OF THE INVENTION

There is a continuing search for materials having desirable fragrances. Such materials are sought either to fortify weak natural materials, to obviate weaknesses of natural materials, or to provide new fragrance or perfume types which have not heretofore been available. Such substances desirably have stability in a wide variety of perfumed articles and perfume compositions, are easily manufactured and have intense aromas.

It is known to carry out a two-step reaction wherein myrtenol is reacted with methyl vinyl ether in the presence of mercuric acetate as a catalyst in order to obtain the vinyl ether of myrtenol; and wherein the resulting vinyl ether is then rearranged to form an aldehyde having the structure:

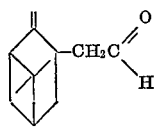

The compound so formed is relatively uninteresting from the standpoint of perfumery (See Julia et al. Bull. Soc. Chim., 1962, 1947–1952).

Furthermore, it is know to react nopol (pinomethanol) with phosphorous pentachloride to form a compound of the structure:

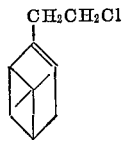

then to form the corresponding Grignard reagent from the nopol derivative using magnesium and react the Grignard reagent with triethoxy methane to form 6,6 dimethyl bicyclo[3.1]hept-2-ene-2-propanol (hereinafter referred to as pinoacetaldehyde) having the structure:

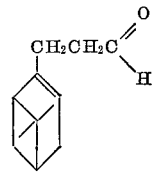

(See Bull. Soc. Chim., France, 1955, 1399–1408.) The compound was heretofore recognized only as an intermediate for the production of other chemical compounds, and was not known or disclosed for perfume uses. It is also known to react acrolein with beta-pinene to form 6,6 dimethyl bicyclo[3.1.1]hept-2-ene-2-n-butanol (hereinafter referred to as pinopropionaldehyde). See Kruk et al., Recl. Trav. Chim. Pays-Bas. 1969, 88(2), (1839–48). As in the case of pinoacetaldehyde, the pinopropionaldehyde was heretofore not recognized as being useful as a perfume ingredient.

THE INVENTION

The invention comprises the novel products, the novel processes and steps of processes according to which such products are manufactured, as well as the use in perfumery of the said novel products and known lower homologues thereof, specific embodiments of which are described hereinafter by way of example and in accordance with which it is now preferred to practice the invention.

Briefly, the present invention provides the novel pinane derivatives, alpha-alkyl and alpha, alpha-dialkyl-6,6 dimethyl bicyclo [3.1.1]hept-2-ene-alkanals (hereinafter referred to as alpha-substituted pinoacetadehydes) having the formulae:

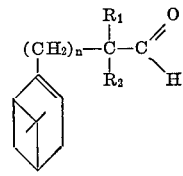

wherein $R_1$ is hydrogen or lower alkyl; $R_2$ is lower alkyl, and $n$ is 1 or 2 as well as the corresponding lower alkyl acetals having the structure:

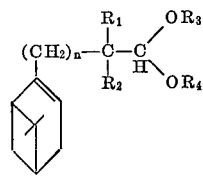

wherein $R_3$ and $R_4$ are the same or different lower alkyl groups, and wherein $n$ is 1 or 2 and lower alkylene cyclic acetals having the structure

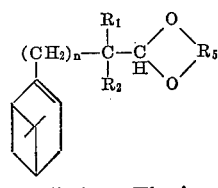

wherein $R_5$ is lower alkylene. The invention also contemplates perfume and fragrance materials containing such compounds, as well as the known lower homologues thereof. The materials found to be useful in the instant invention are produced by several novel methods:

(I) One such method involves reacting pinocarveol with a substituted or unsubstituted ethyl vinyl ether in the presence of a protonic acid such as phosphoric acid with or without a suitable additional inert reaction vehicle. When ethyl vinyl ether is used, the reaction product is pinoacetaldehyde. When the vinyl group is alkyl or dialkyl substituted in the beta-position, the reaction product is one of the novel products of this invention. The reaction can be represented as follows:

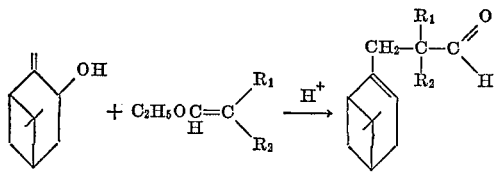

Dialkyl acetals of the above-mentioned aldehydes can be formed by reaction thereof with ethyl orthoformate or alcohols in the presence of an acid catalyst. Alkylene cyclic acetals of the above-mentioned aldehydes can be produced by reaction thereof with a lower alkylene glycol such as ethylene glycol or propylene glycol.

(II) In another method, a Schiff base is formed by reacting a suitably substituted or unsubstituted acetaldehyde with a primary amine such as a lower alkyl amine or cycloalkyl amine, for example cyclohexyl amine, thus:

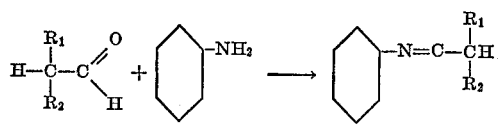

The resulting Schiff base is reacted with a Grignard regent such as methyl magnesium chloride and reacting the resulting salt with a myrtenyl halide such as myrtenyl chloride, myrtenyl bromide, or the like, thus:

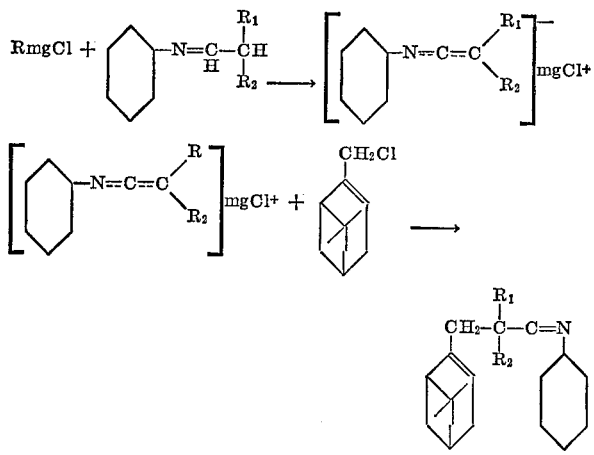

The resulting Schiff base, a novel chemical compound, is then hydrolyzed in situ (preferably using an aqueous acid such as 10% sulfuric acid) to form the desired pinoacetaldehyde, or alpha-substituted or alpha, alpha-disubstituted pinoacetaldehyde. The general technique applied to alkylation of aldehydes is disclosed by Stork and Dowd at 85 J. Am. Chem. Soc. 2178–2180 [July 20, 1963]. The acetals and cycliacetals of the aforementioned aldehydes, again, may be formed as desired as above. It will be understood from the present disclosure that some of the alpha-monoalkyl and alpha, alpha-dialkyl pinoacetaldehyde compounds, can be obtained in more than one stereoisomeric form and that these stereoisomers are intended to be included in the formulas shown.

It has been found that the known pinoalkanals and the novel alpha-substituted and alpha, alpha-disubstituted pinoalkanals and their lower alkyl acetals and lower alkylene cycliacetals of this invention possess a fresh, green aroma, part woodsy, part flowery, ozone-like and reminiscent of early morning dew-laden vegetation. The lower homologs (e.g. the pinoacetaldehyde and pinopropionaldehyde and their lower alkyl acetals) are more pungent and the higher (e.g. pinoisobutyraldehyde) unexpectedly softer and more floral; all exhibiting good persistence. This fragrance quality particularly makes pinoalkanals including the novel alpha-alkyl and alpha, alpha-dialkyl pinoalkanals and their acetals and cyclic acetals suitable for incorporation into perfume compositions and fragrance modifying compositions wherein a "fresh air" fragrance character is desirable. The intensity and other properties of pinoalkanals including the novel substituted pinoalkanals and acetals of this invention are sufficiently marked so that they can be employed either as purified materials or in admixture, or in mixtures of lesser purity as obtained by the novel reactions herein described.

Several pinoalkanols including the novel alpha-alkyl and alpha, alpha-dialkyl pinoalkanals may be conveniently produced from the known material pinocarveol which latter material can be obtained by the process described in the United States application of Peter W. D. Mitchell, Ser. No. 732,539 filed on May 28, 1968, in which beta-pinene is reacted with hydrogen peroxide and a small amount of selenium dioxide.

One of the reactions of this invention involves a conversion of pinocarveol to yield substantial quantities of the substituted or unsubstituted pinoalkanals. The reaction is carried out with the substituted or unsubstituted alkyl vinyl ethers in the presence of a protonic acid.

The reaction product formed is dependent upon the particular substituted alkyl vinyl ether of the formula

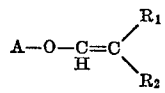

where A is lower alkyl, $R_1$ is hydrogen or lower alkyl and $R_2$ is hydrogen or lower alkyl. The following alkyl vinyl ethers will yield the indicated reaction products:

| Alkyl vinyl ether | Reaction product |
| --- | --- |
| Ethyl vinyl ether | 6,6 dimethyl bicyclo [3.1.1] hept-2-ene-2-propionaldehyde. |
| Ethyl (2-methyl-1-propenyl) ether. | Alpha, alpha 6,6-tetramethyl bicyclo [3.1.1] hept-2-ene-2 propionaldehyde. |
| Ethyl (2-ethyl-1-butenyl) ether. | Alpha, alpha-diethyl-6,6-dimethyl bicyclo [3.1.1] hept-2-ene-2-propionaldehyde. |
| Ethyl (2-methyl-1-pentenyl) ether. | Alpha, 6,6-trimethyl-alpha-n-propyl-bicyclo [3.1.1] hept-2-ene-2-propionaldehyde. |

The preferred protonic acid is phosphoric acid. In order to effect the reaction, from 0.005% up to 2% and preferably from 0.01% up to about 0.5% (by weight of the reaction mass) of protonic acid should be used. The reaction is preferably carried out at superatmospheric pressures. The best results have been obtained with reaction pressures in the range of from about three to about seven atmospheres and temperatures in the range of 140–170° C. The amount of reactants used can vary over wide limits, and preferably the alkyl vinyl ether reactant is present in excess. Preferably, the molar ratio of ether to pinocarveol is from 1.5:1 up to about 2.5:1. At the termination of the reaction which may proceed for a period of from one hour up to three hours (depending on the temperature of reaction and the yield desired), the excess vinyl ether reactant is stripped off and the substituted or unsubstituted pinoacetaldehyde is distilled usually under reduced pressures. This first reaction sequence is preferred for the production of unsubstituted pinoactaldehyde.

A second reaction sequence may also be used for the production of several pinoalkanals. This method can be practiced step-by-step as follows:

(1) Production of the Schiff base of an aldehyde: In producing the Schiff base, any aldehyde may be used which has an available α-hydrogen and any primary amine can be used. Thus, in producing pinoisobutyraldehyde, for example, the aldehyde used would be isobutyraldehyde. In producing pinoisopropionaldehyde, the aldehyde used would be propionaldehyde. In production of the Schiff base, the use of equimolar amounts of amine and aldehyde is desirable; use of an excess of either ingredient giving rise to unnecessary added cost. Preferably the temperature of reaction is from 10° C. up to 30° C.

(2) Production of a Schiff base-Grignard reagent: After drying, the Schiff base produced in (1) is reacted with any convenient, inexpensive, readily available Grignard reagent, preferably a lower alkyl magnesium halide such as methyl magnesium chloride in the presence of a suitable inert solvent such as tetrahydrofuran. The quantity of the methyl magnesium chloride or other Grignard reagent should be in slight molar excess to insure completion of the reaction. The preferred excess of Grignard reagent is of the order of 5–10%. The reaction should take place at a temperature in the range of from about 50° C. to about 80° C.

(3) Addition of the myrtenyl moiety and hydrolysis: At the completion of the reaction of (2), myrtenyl chloride or myrtenyl bromide is added to the Schiff base-Grignard material so produced. It is preferred that the myrtenyl halide be in molar excess with respect to the Schiff base-Grignard material. This reaction is carried out preferably at atmospheric pressure. The preferred temperature range for this reaction is from about 50° C. to 80° C. The product is the Schiff base of the desired substituted or unsubstituted pinoacetaldehyde. The Schiff base so produced is hydrolyzed in any suitable readily available aqueous acid, such as 10% sulfuric acid in order to form the desired substituted or unsubstituted pinoacetaldehyde. The products of the foregoing reactions can be neutralized, washed and purified to yield a pure product. Purification can be carried out by conventional methods such as extraction, chromatography, distillation and the like.

The substituted and unsubstituted pinoalkanals and corresponding acetals of this invention can be incorporated into a wide variety of compositions which will be enhanced by their flowery, ozone-like, woodsy notes. As noted above, the novel materials, as well as the known pinoacetaldehyde and pinopropionaldehyde, can be added to perfume compositions in the pure form or in admixture with one another. They can be added to mixtures of materials in fragrance-modifying compositions to provide a desired fragrance character to a finished perfume material or other article. A fragrance-modifying composition is one which does not of itself provide a total fragrance impression (as would a perfume composition), but it alters and enhances, reinforces or fortifies another composition to provide a finished perfume or overall fragrance.

The perfume and fragrance compositions obtained according to this invention are suitable in a wide variety of perfumed articles and can also be used to enhance, modify or reinforce natural fragrance materials. It will thus be appreciated that pinoacetaldehyde, pinopropionaldehyde and substituted pinoalkanals, and acetals thereof of this invention are useful as olfactory agents and fragrances.

The term "perfume composition" is used herein to mean a mixture of compounds, including, for example, natural oils, synthetic oils, alcohols, other aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round off and accompany the main note; (c) fixatives which include odorous substances which lend a particular note to the perfume throughout all stages of evaporation, and substances which retard evaporation; and (d) top-notes which are usually low-boiling fresh-smelling materials. Such perfume compositions or the novel materials of this invention can be used in conjunction with carriers, vehicles, solvents, dispersants, emulsifiers, surface-active agents, aerosol propellants, and the like.

In perfume compositions the individual components contribute their particular olfactory characteristics, but the overall effect of the perfume composition will be the sum of the effect of the each ingredient. Thus, the substituted and unsubstituted pinoacetaldehydes and acetals thereof of this invention can be used to alter the aroma characteristics of a perfume composition, for example, by highlighting or moderating the olfactory reaction contributed by another ingredient of the composition.

The amount of pinoalkanal or alpha-substituted and disubstituted pinoalkanals or acetals thereof of this invention which will be effective in perfume compositions depends on many factors, including the other ingredients, their amounts and the effects which are desired. It has been found that perfume compositions containing as little as 3.0% by weight of mixtures or compounds of this invention, or even less can be used to impart a "fresh air" flowery odor to soaps, cosmetics and other products. They are well suited to use in the preparation of lavender fragrances. The amount employed will depend on considerations of cost, nature of the end product, the effect desired in the finished product, and the particular fragrance sought. All parts, proportions, percentages, and ratios herein are by weight, unless otherwise indicated.

The substituted or unsubstituted pinoalkanals or acetals disclosed herein, mixtures thereof, and reaction mixtures containing them can be used alone, in a fragrance-modifying composition, or in a perfume composition as an olfactory component in detergents and soaps; space deodorants; perfumes; colognes, bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder and the like. When the pinoalkanals or acetals of this invention are used in perfumed articles such as the foregoing they can be used in amounts of 0.1% or lower. Generally it is preferred not to use more than about 1.0% in the finished perfumed article, since the use of too much will tend to unbalance the total aroma and will needlessly raise the cost of the article.

The following examples serve the illustrate embodiments of the invention as it is now perferred to practice it. It will be understood that these examples are illustrative and the invention is to be considered restricted thereto only as indicated in the appended claims.

EXAMPLE I

Preparation of pinoacetaldehyde by reaction of pinocarveol with ethyl vinyl ether Into a 1-liter autoclave the following ingredients were placed:

| | G. |
|---|---|
| Pinocarveol | 250 |
| Ethyl vinyl ether | 250 |
| 85% phosphoric acid | 0.5 |

The contents of the autoclave were heated at a temperature range of 150–155° C. over a period of 2½ hours. The pressure within the autoclave was in the range of 70–80 p.s.i.g. At the termination of the reaction the contents of the autoclave were removed and the organic phase was washed with an equal volume of 5% of sodium bicarbonate and then with an equal volume of water. The excess ethyl vinyl ether was stripped off and the resulting crude product was distilled at 84–88° C. on a 12″ Goodloe column (pressure: 2.8–3.2 mm. Hg; reflux ratio 9:1). Infra red, NMR and mass spectral analysis confirmed the following structure of the product:

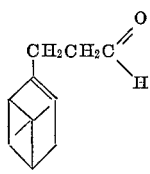

The pinoacetaldehyde thus formed had a highly persistent, very fresh, pungent, flowery, woodsy, ozone-like odor reminiscent of early morning dew-laden vegetation.

EXAMPLE II

The preparation of pinoisobutyraldehyde (a) Formation of Schiff base: 396 g. (4.0 moles) of cyclohexylamine was placed in a 1-liter flask. Over a period of one hour, while maintaining the temperature at 20° C., 292 g. of isobutyraldehyde was added. At the end of the addition period, the aqueous and organic phases were separated and the organic phase consisting of the Schiff base N(2-methyl propylidene) cyclohexylamine was dried over magnesium sulfate and distilled at a vapor temperature of 61–67° C. (pressure: 13–14 mm. Hg);

(b) Reaction of Schiff base with Grignard reagent: Into a 3-liter flask purged with nitrogen, 680 ml. (2.02 moles) of methyl magnesium chloride in tetrahydrofuran was added. The contents of the flask were heated to 60° C. Over a period of 1 hour, 282 g. of the Schiff base produced in Part (a) was added, maintaining the temperature in the range of 50° C.–70° C. After addition, the contents were heated for 4 hours until the evolution of hydrogen ceased;

(c) Reaction of the Schiff base-Grignard Reagent with Myrtenyl chloride: Over a period of 2 hours 444 g. of 71.3% (wt.) myrtenyl chloride were added to the reaction product produced in Part (b), while maintaining the temperature in the range of 65–70° C. After addition was completed, the reaction mass was stirred for a period of 8 hours, maintaining the temperature in the range of 60–72° C.;

(d) Hydrolysis of Schiff base product formed in (c): The pH of the reaction mass was brought to 4 by addition of 1,140 g. of 10% aqueous sulfuric acid. The mass was then heated for a period of thirty minutes at 65° C. after which the aqueous phase was separated from the organic phase. The aqueous layer was extracted with 550 ml. of toluene and the toluene extract was bulked with the organic layer. The organic phase was then washed per the following sequence:

(a) One 550 ml. volume of 5% aqueous hydrochloric acid;
(b) One equal volume of saturated sodium chloride solution;
(c) One equal volume of a 3% sodium bicarbonate solution (bringing the pH to 8.0);
(d) One equal volume of a saturated sodium chloride solution [bringing the pH to 7.0].

The solvent was then stripped off and the reaction product was distilled in a 12-inch Goodloe column at a vapor temperature of 91–94° C. [pressure: 2.6–3.0 mm. Hg: reflux ratio 9:1]. 236 g. of the reaction product, alpha-pinyl isobutyraldehyde was recovered, the structure of which, confirmed by NMR, infra red and mass spectral analysis was as follows:

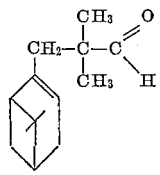

The alpha-pino-isobutyraldehyde had a highly persistent, fresh soft floral, woodsy, ozone-like odor reminiscent of early morning dew-laden vegetation.

EXAMPLE III

The following mixture is prepared:

| Ingredients: | Parts by weight |
| --- | --- |
| Coumarin | 100 |
| Linalool | 200 |
| Benzylacetate | 50 |
| Geranium absolute | 30 |
| Methylacetophenone | 50 |
| Bergamot | 40 |
| Lavander, Barreme | 120 |
| Pinoacetaldehyde (Product of Example I) | 80 |
| Benzophenone | 25 |
| Trichloromethyl phenyl carbinyl acetate | 25 |
| Hydroxycitronellal | 20 |
| Sauge Sclaree | 20 |
| Neroli bigarade | 20 |
| Isobutylsalicylate | 10 |
| Ylang-Ylang Bourbon | 10 |
| Patchouli oil | 10 |
| Vetiver acetate | 5 |
| Mousse de Chene absolute | 5 |
| Anis alcohol | 10 |
| Basilicum absolute | 5 |

A pleasing new fragrance results giving an interesting variation which can be described as a "fresh-air" quality to the basic classic Foin Coup cologne blend.

EXAMPLE IV

The following mixture is prepared:

| Ingredients: | Parts by weight |
| --- | --- |
| Coumarin | 100 |
| Linalool | 200 |
| Benzylacetate | 50 |
| Geranium absolute | 30 |
| Methylacetophenone | 50 |
| Bergamot | 40 |
| Lavander, Barreme | 120 |
| Alpha-pinoisobutyraldehyde (Product of Example II) | 80 |
| Benzophenone | 25 |
| Trichloromethyl phenyl carbinyl acetate | 25 |
| Hydroxycitronellal | 20 |
| Sauge Sclaree | 20 |
| Neroli bigarade | 20 |
| Isobutylsalicylate | 10 |
| Ylang-Ylang, Bourbon | 10 |
| Patchouli oil | 10 |
| Vetiveryl acetate | 5 |
| Mousse de Chene absolute | 5 |
| Anis alcohol | 10 |
| Basilicum absolute | 5 |

A pleasing new fragrance results giving an interesting variation which can be described as a "fresh-air" quality to the basic classic Foin Coupe cologne blend.

It will be appreciated from the present description that the pinoalkanals and the novel substituted derivatives of pinoalkanals and acetals thereof can be included in other perfume compositions and in other perfumed articles such as detergents, shampoos, powders, soaps, deodorants, sachets, paper goods, and the like.

What is claimed is:
1. A compound having the structure:

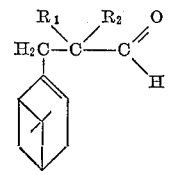

wherein $R_1$ is hydrogen or lower alkyl and $R_2$ is lower alkyl.

2. α,α,6,6-tetramethyl bicyclo[3.1.1]hept-2-ene-2-propionaldehyde.

3. A process for the preparation of substituted and unsubstituted pinoalkanals which comprises heating a mixture of pinocarveol and a compound having the structure:

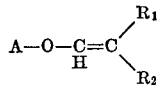

wherein A is lower alkyl, $R_1$ is hydrogen or lower alkyl, and $R_2$ is hydrogen or lower alkyl, in the presence of a phosphoric acid catalyst at a pressure in the range of from about 3 up to about 7 atmospheres and at a temperature in the range of 140° C. to 170° C.

4. The process of claim 3 wherein the reaction is carried out at a pressure in the range of 70–80 p.s.i.g. and at a temperature in the range of 150–155° C.

References Cited

UNITED STATES PATENTS 2,918,496   12/1959   Booth _____ 260—598

BERNARD HELFIN, Primary Examiner